US012173171B2

(12) United States Patent
Sen et al.

(10) Patent No.: US 12,173,171 B2
(45) Date of Patent: Dec. 24, 2024

(54) LOW MIGRATION UV-LED CURABLE INK FORMULATIONS

(71) Applicant: Avery Dennison Corporation, Mentor, OH (US)

(72) Inventors: Radha Sen, Mentor, OH (US); Michael P. Garlock, Chardon, OH (US)

(73) Assignee: Avery Dennison Corporation, Mentor, OH (US)

( * ) Notice: Subject to any disclaimer, the term of this patent is extended or adjusted under 35 U.S.C. 154(b) by 627 days.

(21) Appl. No.: 17/601,730

(22) PCT Filed: Apr. 8, 2020

(86) PCT No.: PCT/US2020/027212
§ 371 (c)(1),
(2) Date: Oct. 6, 2021

(87) PCT Pub. No.: WO2020/210316
PCT Pub. Date: Oct. 15, 2020

(65) Prior Publication Data
US 2022/0195227 A1      Jun. 23, 2022

Related U.S. Application Data

(60) Provisional application No. 62/830,791, filed on Apr. 8, 2019.

(51) Int. Cl.
| | | |
|---|---|---|
| C08F 2/46 | (2006.01) | |
| C08F 2/50 | (2006.01) | |
| C08G 61/04 | (2006.01) | |
| C09D 11/037 | (2014.01) | |
| C09D 11/101 | (2014.01) | |
| C09D 11/102 | (2014.01) | |
| C09D 11/107 | (2014.01) | |
| C09D 11/322 | (2014.01) | |
| C09D 11/38 | (2014.01) | |
| C09D 11/40 | (2014.01) | |

(52) U.S. Cl.
CPC ............ C09D 11/40 (2013.01); C09D 11/037 (2013.01); C09D 11/101 (2013.01); C09D 11/102 (2013.01); C09D 11/107 (2013.01); C09D 11/322 (2013.01); C09D 11/38 (2013.01)

(58) Field of Classification Search
CPC ..... C09D 11/102; C09D 11/101; C09D 11/40; C09D 11/037; C09D 11/38; C09D 11/107; C09D 11/322; C08F 2/16; C08F 2/50; C08G 61/04
USPC ............... 522/64, 61, 1, 189, 184, 71; 520/1
See application file for complete search history.

(56) References Cited

U.S. PATENT DOCUMENTS

| | | | |
|---|---|---|---|
| 9,701,856 B2 | 7/2017 | Loccufier et al. | |
| 9,902,865 B2 | 2/2018 | Shimono et al. | |
| 10,941,307 B2 | 3/2021 | Tsuyama et al. | |
| 11,001,723 B2 | 5/2021 | Fleckenstein et al. | |
| 2015/0197651 A1 | 7/2015 | Fukagawa | |
| 2016/0167301 A1 | 6/2016 | Cole et al. | |
| 2017/0015856 A1 | 1/2017 | Illsley et al. | |
| 2022/0267623 A1* | 8/2022 | Araki ................... B41M 5/0023 |

FOREIGN PATENT DOCUMENTS

| | | |
|---|---|---|
| CN | 104583342 | 4/2015 |
| CN | 108841238 | 11/2018 |
| CN | 109575688 | 4/2019 |
| EP | 2457963 | 3/2014 |
| EP | 3156461 | 4/2020 |
| EP | 3323863 | 6/2020 |
| JP | 2012-111848 | 6/2012 |
| JP | 2013-001810 | 1/2013 |
| JP | 2013-227445 | 11/2013 |
| JP | 2014-070104 | 4/2014 |
| JP | 2014-185319 | 10/2014 |
| JP | 2017-113944 | 6/2017 |
| JP | 2018-177959 | 11/2018 |
| JP | 2020-507656 | 3/2020 |
| RU | 2394856 | 7/2010 |
| WO | 2017/010464 | 1/2017 |
| WO | 2017/086224 | 5/2017 |
| WO | 2018/143929 | 8/2018 |
| WO | 2018/146258 | 8/2018 |
| WO | WO-2018143929 A1 * | 8/2018 ................ C08F 2/50 |

OTHER PUBLICATIONS

International Preliminary Report on Patentability dated Sep. 28, 2021 issued in corresponding IA No. PCT/US2020/027212 filed Apr. 8, 2020.
International Search Report and Written Opinion dated Jul. 6, 2020 issued in corresponding IA No. PCT/US2020/027212 filed Apr. 8, 2020.

* cited by examiner

Primary Examiner — Jessica Whiteley

(57) ABSTRACT

UV-LED ink composition compositions containing a matrix or binder system, one or more colorants, and one or more photo-initiators. In some embodiments, the matrix or binder system is cured using one or more UV-LED sources. In some embodiments, the matrix or binder system contains one or more materials that are polymerized, crosslinked, and/or cured upon exposure to the UV-LED source. This allows the ink composition to be free of any organic solvents. After polymerization and/or crosslinking, the ink is dry. UV-LED ink compositions can be better suited for curing black inks, improve/increase productivity due to its instant on/instant off capability, and produce little or no heat. Such compositions may have environmental benefits as well as the curing process does not produce ozone and requires less exhaust air surrounding the press.

30 Claims, No Drawings

LOW MIGRATION UV-LED CURABLE INK FORMULATIONS

CROSS-REFERENCE TO RELATED APPLICATION

The present application is a 371 of International Application No. PCT/US2020/027212, which was published in English on Oct. 15, 2020, and claims the benefit of U.S. Provisional Application No. 62/830,791 filed Apr. 8, 2019, both of which are incorporated herein by reference in their entireties.

FIELD

This invention in in the field of UV-LED curable ink formulation, particularly low migration, UV-LED curable ink formulations, and methods of making and using thereof are described herein.

BACKGROUND

UV-LED cure of inks requires specific photo-initiators to obtain a non-yellowing (for white inks), completely-cured, low migration ink film. This can be difficult to achieve as the only commercially viable photo-initiator for this application, diphenyl(2,4,6-trimethylbenzoyl)phosphine oxide (TPO), can migrate from the ink to the label and/or the substrate (e.g., packaging) to which the label is adhered due to its low molecular weight. This can be problematic for packaging that is handled by hand, either by retailers, customers, etc., as TPO is a known skin sensitizer. Moreover, regulations regarding labels/packaging, particularly for food and pharmaceutical products, have strict criteria with respect to migration of components which can adversely affect the quality of the food products or pharmaceuticals or the health of consumers who use such products.

There exists a need for ink formulations with low migration and little or no skin sensitization that are effective as photo-initiators and can be used in a cost effective manner.

SUMMARY

UV-LED ink composition compositions containing a matrix or binder system, one or more colorants, and one or more photo-initiators which exhibit low migration are described herein. In some embodiments, the matrix or binder system is cured using one or more UV-LED sources. In some embodiments, the matrix or binder system contains one or more materials that are polymerized, crosslinked, and/or cured upon exposure to the UV-LED source. In some embodiments, the one or more materials are polymerized and/or crosslinked by free radical processes. This allows the ink composition to be free of any organic solvents. After polymerization and/or crosslinking, the ink is cured. UV-LED ink compositions described herein can be better suited for curing a variety of inks, including black inks, improve/increase productivity due to its instant on/instant off capability, and produce little or no heat. Such compositions may have environmental benefits as well as the curing process does not produce ozone and requires less exhaust air surrounding the press.

In some embodiments, the matrix contains one of more of the following: one or more chain extension agents, one or more multifunctional crosslinking agents or monomers, one or more reactive diluents, and one or more materials for improving surface cure. The matrix may also contain one or more materials or monomers that provides or creates flexibility, elongation, and/or stretch in the ink composition matrix. The matrix may contain one more additives including, but not limited to, plasticizers, surfactants, flow control additives, and the like, and one or more colorants (e.g., pigments and/or dyes).

The compositions described herein contain one or more photoinitiators that exhibit low migration. In some embodiments, the photoinitiator is a polymeric diphenyl(2,4,6-trimethylbenzoyl)phosphine oxide, referred to as polymeric TPOL. TPO and TPOL have the same chemical structure but TPO is the dry form of the initiator and TPOL is a liquid form. The term "polymeric TPOL" refers to one or more molecules of diphenyl(2,4,6-trimethylbenzoyl)phosphine oxide (TPOL) covalently bound to, or non-covalently associated with, one or more materials to reduce migration of the TPOL. In some embodiments, the TPOL is covalently bound to, or non-covalently associated with, one or more oligomers, polymers (e.g., linear, branched, or star polymers), dendrimers, or combinations thereof. In some embodiments, the TPOL is covalently bound to a polymer having a molecular weight of at least 1,000, 2,000, 3,000, 4,000, 5,000, 7,500, 10,500, 12,000, or 15,000 Daltons.

In some embodiments, the TPOL is covalently bound to a liner polymer (e.g., TPO bound to the polymer ends or grafted at multiple locations on the polymer chain). In other embodiments, the TPO is covalently bound to a branched polymer, star polymer, or a dendrimer. In some embodiments, the linear or branched polymer is a polyethylene oxide (PEO) homopolymer or copolymer. In some embodiments, the branched polymer is formed by functionalizing a trifunctional core molecule with PEO and then functionalizing the ends of the PEO chains with TPO. In some embodiments, the ink composition further contains non-oligomeric or -polymeric TPOL.

As shown in the examples, the use of a polymeric TPOL reduces the amount of residual TPOL compared to formulations containing free TPOL (not bound or associated with a polymer). In some embodiments, the use of a polymeric TPOL reduces the amount of residual TPOL by at least 5%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, or more. In some embodiments, the use of polymeric TPOL results in a residual amount of TPOL less than 300, 275, 250, 225, 200, 175, 150, 125, 100, 95, 90, 85, 80, 75, 70, 65, 60, 55, 50, 45, 40, 35, 30, 25, 20, 15, 10, or 5 ppm.

BRIEF DESCRIPTION

I. Ink Compositions

UV-LED curable ink compositions are described herein. UV LED is an alternative UV curing system. In some embodiments, the system is based on or includes a solid state device. The process typically uses a narrow wavelength band (e.g., 375 nm or 395 nm for graphic arts) with a maximum bandwidth of 40 nm. Lamps can be designed with specific wavelength outputs for specialty applications. UV-LED lamps provide significant higher power outputs compared to traditional UV lamps. For example, UV-LED Lamps can produce up to 16,000 mW/cm$^2$ compared to 1,648 mW/cm$^2$ for traditional UV lamps.

UV-LED processes do not involve IR radiation and produce minimal heat transfer. UV-LED sources are more compact, low voltage, instant on/off (no shutters or cooling off periods are necessary), provide consistent output over the operating life, produce no ozone or volatile organic compounds (eliminates need for exhaust), and are more efficient compared to traditional UV and/or solvent based processes.

A. Matrix

The ink composition compositions described herein contains a matrix or binder system in which one or more pigments are dissolved and/or dispersed. In some embodiments, the matrix or binder system is cured using one or more UV-LED sources. In some embodiments, the matrix or binder system contains one or more materials that are polymerized, crosslinked, and/or cured upon exposure to the UV-LED source. In some embodiments, the one or more materials that are polymerized, crosslinked, and/or cured upon exposure to the UV-LED source contain one or more reactive functional groups that can undergo free radical polymerization and/or crosslinking. In some embodiment, the one or more materials above are one or more acrylates containing monomers oligomers, and/or polymers, wherein the monomers, oligomers, or polymers contain one, two, three, four, or more reactive acrylate groups. The use of this matrix allows the ink composition to be free of any organic solvents. After polymerization and/or crosslinking, the ink is cured. UV-LED ink compositions can be better suited for curing a variety of inks, including black inks, improve/increase productivity due to its instant on/instant off capability, and produce little or no heat. Such compositions may have environmental benefits as well as the curing process does not produce ozone and requires less exhaust air surrounding the press.

In some embodiments, the matrix contains at least one of the following: one or more chain extension agents, one or more multifunctional crosslinking agents or monomers, one or more reactive diluents, and/or one or more materials for improving surface cure. The matrix may also contain one or more materials (e.g., monomers or oligomers) that provides or creates flexibility, elongation, and/or stretch in the ink composition matrix. Non-limiting examples of the various classes of materials listed above are provided below. However, it should be appreciated that molecules which are chain extension agents may also be multifunctional crosslinking agents and vice versa depending on the number of functional groups and/or the presence or absence of other materials in the matrix.

The matrix may further contain one more additives including, but not limited to, plasticizers, surfactants, flow control additives, and the like, and one or more colorants (e.g., pigments and/or dyes).

1. Chain Extension Agents

In some embodiments, the one or more chain extension agents contains a highly reactive monomer, oligomer, and/or polymeric species. In some embodiments, the one or more chain extension agents contains, or is, a difunctional acrylate. In some embodiments, the difunctional acrylate is a diol diethoxylate diacrylate, such as propane, butane, pentane, or hexane diol. In some embodiments, the difunctional acrylate is 1,6-hexanediol diethoxylate diacrylate. Examples include, but are not limited to, molecules that begin with M2 . . . , such as M202 or M2010.

In some embodiments, the chain extension agent is present in an amount from about 5% to about 60% by weight of the ink composition, from about 5% to about 55% by weight of the ink composition, or from about 5% to about 53% by weight of the ink composition. In some embodiments, the chain extension agent is present in an amount from about 5% to about 10% by weight of the ink composition. In some embodiments, the chain extension agent is present in an amount of about 5% or about 6% by weight of the ink composition. In other embodiments, the chain extension agent is present in an amount from about 50% to about 55% by weight of the ink composition or about 53% by weight of the ink composition.

2. Multifunctional Crosslinking Agents

In some embodiments, the matrix or binding system contains or more multifunctional crosslinking agents. In some embodiments, the crosslinking agent contains at least two reactive functional groups. In some embodiments, the crosslinking agent contains more than two, such as three, four, five, or greater reactive functional groups. The crosslinking agent can be a monomer, oligomer, and/or polymer. In some embodiments, the crosslinking agent is a monomer. In some embodiments, the crosslinking agent is a trifunctional monomer. In some embodiments, the crosslinking agent is a triacrylate monomer. In some embodiments, the crosslinking agent contains, or is, a trimethylolpropane triethoxylate triacrylate. Examples include, but are not limited to, HD(EO)3DA; TMP(EO)3TA; molecules that begin with M3 . . . , such as M3130, M3160, M3190, etc. These materials can also be classified as low residual (high purity) such as LR3130.

In some embodiments, the multifunctional crosslinking agent is present in an amount from about 1% to about 25% by weight of the ink composition, from about 3% to about 15% by weight of the ink composition, or from about 4% to about 8% by weight of the ink composition. In some embodiments, the multifunctional crosslinking agents is present in an amount from about 5% to about 7% by weight of the ink composition. In some embodiments, the multifunctional crosslinking agents is present in an amount of about 6% by weight of the ink composition.

3. Reactive Diluents

In some embodiments, the matrix or binding system contains one or more reactive diluents. "Reactive diluent", as used herein, refers molecules which reduce the viscosity of the ink composition during the curing process. In some embodiments, the one or more reactive diluents is a monofunctional monomer, oligomer, and/or polymer. In other embodiments, the one or more reactive diluents is a difunctional monomer, oligomer, and/or polymer. In some embodiments, the two reactive functional groups in the difunctional reactive diluent as the same functional group or different functional groups. Different functional groups can allow curing by different processes, e.g., free radical and cationic or anionic polymerization. In some embodiments, the one or more reactive diluents is a combination of a monofunctional and difunctional reactive diluents. In some embodiments, the monofunctional reactive diluent is a monofunctional acrylate. In some embodiments, the monofunctional acrylate is a cyclic trimethylolpropoylacrylate. In some embodiments, the difunctional reactive diluent is a divinyl, diacrylate, or a mixed vinyl acrylate. Examples, include, but are not limited to, monofunctional acrylates that begin with M1 . . . , such as M122.

In some embodiments, the monofunctional reactive diluent is present in an amount from about 10% to about 40% by weight of the ink composition, from about 15% to about 35% by weight of the ink composition, or from about 20% to about 30% by weight of the ink composition. In some embodiments, the multifunctional crosslinking agents is present in an amount from about 25% to about 30% by weight of the ink composition. In some embodiments, the multifunctional crosslinking agents is present in an amount from about 25% to about 27% by weight of the ink composition. In some embodiments, the difunctional reactive diluent is present in an amount from about 10% to about 15%, from about 11% to about 14%, from about 12% to about 14%.

4. Surface Cure Agents

In some embodiments, the matrix or binding system contains one or more surface curing agents. "Surface curing agent" as used herein means molecules that improve surface cure of the ink composition. In some embodiments, the surface curing agent is a functionalized polyether acrylate oligomer. In some embodiments, the surface curing agent is an amine modified polyether acrylate oligomer.

In some embodiments, the surface cure agent is present in an amount from about 1% to about 10% by weight of the ink composition, from about 1% to about 8% by weight of the ink composition, or from about 2% to about 6% by weight of the ink composition. In some embodiments, the surface cure agent is present in an amount from about 3% to about 5% by weight of the ink composition. In some embodiments, the surface cure agent is present in an amount from about 4% to about 5% by weight of the ink composition.

5. Flexibility-Inducing Materials

In some embodiments, the matrix or binding system contains one or more flexibility-inducing materials. In some embodiments, the one or more flexibility-inducing materials provides flexibility, elongation, and/or stretch to the matrix or binding system. In some embodiments, the material(s) is a monomer, oligomer, and/or polymer. In some embodiments, the material(s) is a monomer. In some embodiments, the monomer is a urethane acrylate. Examples include, but are not limited to, CN 991.

In some embodiments, the flexibility-inducing material(s) is present in an amount from about 25% to about 55% by weight of the ink composition, from about 30% to about 50% by weight of the ink composition, or from about 33% to about 49% by weight of the ink composition. In some embodiments, the surface cure agent is present in an amount from about 33% to about 35% by weight of the ink composition. In some embodiments, the surface cure agent is present in an amount from about 48% to about 50% by weight of the ink composition.

6. Surfactants

In some embodiments, the matrix or binding system contains one or more surfactants. In some embodiments, the matrix or binding system contains a mixture of surfactants. In some embodiments, the surfactant mixture improves the jetting and/or spreading/penetration properties of the ink composition on the substrate.

In some embodiments, the surfactant(s) is present in an amount from about 1% to about 5% by weight of the ink composition, from about 1% to about 4% by weight of the ink composition, or from about 2% to about 3% by weight of the ink composition.

B. Photo-Initiator

In some embodiments, the ink composition contains one or more photo-initiators. In some embodiments, the one or more photo-initiators is diphenyl(2,4,6-trimethylbenzoyl) phosphine oxide (TPOL) covalently bound to, or non-covalently associated with, one or more materials to reduce migration of the TPO (herein referred to as "polymeric TPOL"). In some embodiments, the TPOL is covalently bound to, or non-covalently associated with, one or more oligomers, polymers (e.g., linear, branched, or star polymers), dendrimers, or combinations thereof. In some embodiments, the TPOL is modified to introduce one or more functional groups in order to covalently or non-covalently associate the TPOL molecules with an oligomer or polymer as described above. In some embodiments, the polymeric TPOL is sold under the tradename Omnipol TP available from IGM resins.

In some embodiments, the TPOL is covalently bound to a polymer having a molecular weight of at least 1,000, 2,000, 3,000, 4,000, 5,000, 7,500, 10,500, 12,000, or 15,000 Daltons. In some embodiments, the TPOL is covalently bound to a liner polymer (e.g., TPOL bound to the polymer ends or grafted at multiple locations on the polymer chain). In other embodiments, the TPOL is covalently bound to a branched polymer, star polymer, and/or a dendrimer. In some embodiments, the linear or branched polymer is a polyethylene oxide (PEO) homopolymer or copolymer. In some embodiments, the branched polymer is formed by functionalizing a trifunctional core molecule with PEO and then functionalizing the ends of the PEO chains with TPO. In some embodiments, the ink composition further contains non-oligomeric or -polymeric TPOL or TPO.

In some embodiments, the polymeric TPOL is present in an amount from about 2% to about 15% by weight of the ink composition, from about 3% to about 10% by weight of the ink composition, or from about 4% to about 10% by weight of the ink composition. In some embodiments, the polymeric TPOL is present in an amount of about 5% or about 10% by weight of the ink composition.

In some embodiments, the non-polymeric TPOL is present in an amount from about 2% to about 15% by weight of the ink composition, from about 3% to about 10% by weight of the ink composition, or from about 4% to about 10% by weight of the ink composition. In some embodiments, the non-polymeric TPOL is present in an amount of about 5% or about 10% by weight of the ink composition.

As shown in the examples, the use of a polymeric TPOL reduces the amount of residual TPOL compared to formulations containing free TPOL (not bound or associated with a polymer). In some embodiments, the use of a polymeric TPOL reduces the amount of residual TPOL by at least 5%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, or more. In some embodiments, the use of polymeric TPOL results in a residual amount of TPOL less than 300, 275, 250, 225, 200, 175, 150, 125, 100, 95, 90, 85, 80, 75, 70, 65, 60, 55, 50, 45, 40, 35, 30, 25, 20, 15, 10, or 5 ppm.

C. Colorants

In some embodiments, the ink composition contains one or more colorants, such as dyes, pigments, or combinations thereof. The pigment may be selected depending on the desired color of the final ink composition. In some aspects, especially when the ink composition is supplied or used as part of an ink set, the pigment may be chosen to complement other pigments used in separate ink compositions in the ink set.

In some aspects, the ink composition is a cyan ink composition. Exemplary pigments include, but are not limited to, Pigment Blue 1, Pigment Blue 15, Pigment Blue 15:1, Pigment Blue 15:3, Pigment Blue 15:4, Pigment Blue 15:6, Pigment Blue 16, Pigment Blue 17-1, Pigment Blue 22, Pigment Blue 22, Pigment Blue 27, Pigment Blue 28, Pigment Blue 29, Pigment Blue 36, Pigment Blue 60. "Pigment Blue" may also be referred to as phthalocyanine blue.

In some aspects, the ink composition is a magenta ink composition. Exemplary pigments include, but are not limited to, Pigment Red 3, Pigment Red 5, Pigment Red 8, Pigment Red 9, Pigment Red 9:8, Pigment Red 19, Pigment Red 22, Pigment Red 31, Pigment Red 38, Pigment Red 43, Pigment Red 48:1, Pigment Red 48:2, Pigment Red 48:3, Pigment Red 48:4, Pigment Red 48:5, Pigment Red 49:1, Pigment Red 53:1, Pigment Red 57:1, Pigment Red 57:2, Pigment Red 58:4, Pigment Red 63:1, Pigment Red 81, Pigment Red 81:1, Pigment Red 81:2, Pigment Red 81:3, Pigment Red 81:4, Pigment Red 88, Pigment Red 104, Pigment Red 108, Pigment Red 112, Pigment Red 122, Pigment Red 123, Pigment Red 144, Pigment Red 146, Pigment Red 149, Pigment Red 166, Pigment Red 168, Pigment Red 169, Pigment Red 170, Pigment Red 177, Pigment Red 178, Pigment Red 179, Pigment Red 184, Pigment Red 185, Pigment Red 207, Pigment Red 208, Pigment Red 216, Pigment Red 224, Pigment Red 226, Pigment Red 257, Pigment Violet 3, Pigment Violet 19, Pigment Violet 23, Pigment Violet 29, Pigment Violet 30, Pigment Violet 37, Pigment Violet 50, Pigment Violet 88, or Pigment Orange 13, Pigment Orange 16, Pigment Orange 20, or Pigment Orange 36.

In some aspects, the ink composition is a yellow ink composition. Exemplary pigments include, but are not limited to, Pigment Yellow 55, Pigment Yellow 74, Pigment Yellow 79, Pigment Yellow 93, Pigment Yellow 110, Pigment Yellow 120, Pigment Yellow 128, Pigment Yellow 138C, Pigment Yellow 139, Pigment Yellow 150, Pigment Yellow 151, Pigment Yellow 155, Pigment Yellow 156, Pigment Yellow 175, Pigment Yellow 180, Pigment Yellow 185 and Pigment Yellow 213. In a preferred embodiment, the pigment comprises Pigment Yellow 151.

In some aspects, the ink composition is a black ink composition. Exemplary pigments include, but are not limited to, Pigment Black 6, Pigment Black 7, Pigment Black 9, lamp or vegetable black, bone or ivory black, and furnace or channel black.

In some aspects, the ink composition is a light cyan ink composition. Exemplary pigments include those listed above.

In some aspects, the ink composition is a light magenta ink composition. Exemplary pigments include those listed above.

Additional colored ink compositions, such as dark gray, light gray, green, orange, red, white, and blue may be formulated to be included with an ink set, described below. In some aspects, such compositions may have similar make-ups as the compositions above, except with different pigments. In other aspects, the compositions may be different than those described above. In certain aspects, no white ink composition is included in the contemplated ink sets.

| Material | | Surf Mix | Gen 4 % | Gen 5 % | Gen 6 % | Gen 7 % |
|---|---|---|---|---|---|---|
| M202 | HD(Eo)nDA | 50 | 6.00% | 6.00% | 53.01% | 5.30% |
| M3130 | TMP(Eo)3TA | | | | 6.96% | |
| M1110 | Cyclic Trimethylol-propoylacrylate | | 27.63% | 27.63% | | |
| G1122 | Genomer 1122 (Urethane Acrylate) | | 34.29% | 34.29% | | 48.71% |
| LR3600 | Amine Acrylate | | | | 4.97% | |
| VEEA | Vinyl Acrylate | | | | | 13.92% |
| Surf Mix | | | 2.25% | 2.25% | 2.25% | 2.25 |
| Hexamoll DINCH | Plasticizer | | | | 2.98% | |
| 9W2132 | 70% Pigment | | 19.88% | 19.88% | 19.88% | 19.88% |
| TPO | Photoinitiator | | 9.94% | | 4.97% | |
| Poly TPO | Polymeric Photoinitiator | | | 9.94% | 4.97% | 9.94% |

II. Applications

The ink compositions described herein can be used for a variety applications. Exemplary applications include, but are not limited to, pressure sensitive labels, wrap around, in-mold labels, yogurt lids, sachets/pouches, shrink sleeves, and flexible packaging.

EXAMPLES

Example 1: Comparison of White Inks Containing TPO and Polymeric TPOL

White ink formulations were prepared containing the following compositions:

TABLE 1

White Ink Formulations (40-50 Microns)

| Material | White 1 (Monomeric TPO) | White 2 (Polymeric TPOL) |
|---|---|---|
| HD(EO)3DA | 61% | 59% |
| TMP(EO)3TA | 5% | 5% |
| Lauryl Acrylate | 5% | 5% |
| White Pigment | 19.80% | 19.80% |
| TPO (phosphine oxide) | 9% | |
| Poly TPOL | | 11% |
| Tego 270 (surfactant) | 0.40% | 0.40% |
| Tego 450 (surfactant) | 0.20% | 0.20% |

Residual amounts of monomer and TPO on a polycarbonate substrate were analyzed by gas chromatography-mass spectrometry (GC-MS) and expressed as ppm based on ink weight alone. The results are shown below:

TABLE 2

Residual Amounts of TPO

| Residual Monomer by GC-MS | Substrate: Polycarbonate (ppm based on ink weight alone) | |
|---|---|---|
| Ink Name | Monomer (acrylates) | TPO |
| White 1 | 242 | 11,800 |
| White 2 | 614 | 238 |

Example 2. Comparison of Cyan Inks Containing Monomeric TPO and Polymeric TPOL

Cyan ink formulations were prepared containing the following compositions:

TABLE 3

Cyan Ink Formulations (10 Microns)

| Ingredient | Cyan 2 | Cyan 4 |
|---|---|---|
| M202 | | |
| M2010 | 57 | 57 |
| LR3130 | 20 | 20 |
| M3160 | | |
| M122 | 0.1 | 0.1 |
| CN991 | | |
| Tego glide 450 | 0.29 | 0.29 |
| Cyan Pig 9S 1109 | 9.6 | 9.6 |
| TPO | 8.65 | |

TABLE 3-continued

| Cyan Ink Formulations (10 Microns) | | |
| --- | --- | --- |
| Ingredient | Cyan 2 | Cyan 4 |
| Poly TPOL | | 9.5 |
| BAPO | 2.88 | 2.9 |
| DETX | 1.92 | 1.92 |

Residual amounts of monomer and TPO on polyester textile and polyester/cotton textile were analyzed by gas chromatography-mass spectrometry (GC-MS) and expressed as ppm based on ink weight alone. The results are shown below:

TABLE 4

| Residual Amounts of TPO (ppm) | | | |
| --- | --- | --- | --- |
| | | Cyan 2 | Cyan 4 |
| Polyester Textile | Residual Monomer | 643 | 514 |
| | Residual TPO | 150 | 4 |
| Polyester/Cotton Textile | Residual Monomer | 295 | 241 |
| | Residual TPO | 66 | −6 |

Example 3. Comparison of Yellow Inks Containing Monomeric TPO and Polymeric TPOL Yellow ink formulations were prepared containing the following compositions:

TABLE 5

| Yellow Ink Formulations | | |
| --- | --- | --- |
| Ingredient | Yellow 1 | Yellow 2 |
| M202 | 71 | 70 |
| LR3130 | 7 | 7 |
| M3160 | | |
| M122 | 5 | 5 |
| Tego glide 450 | 0.30 | 0.30 |
| Magenta | | |
| Yellow | 5.88 | 5.88 |
| TPO | 6 | |
| Poly TPOL | | 7 |
| BAPO | 2.9 | 2.9 |
| Irgastab UV22 | | |

Residual amounts of monomer and TPO on polyester textile and polyester/cotton textile were analyzed by gas chromatography-mass spectrometry (GC-MS) and expressed as ppm based on ink weight alone. The results are shown below:

TABLE 6

| Residual Amounts of TPO (ppm) | | | |
| --- | --- | --- | --- |
| | | Yellow 1 | Yellow 2 |
| Polyester Textile | Residual Monomer | 154 | 143 |
| | Residual TPO | 20 | 9 |
| Polyester/Cotton Textile | Residual Monomer | 131 | 147 |
| | Residual TPO | 37 | 8 |

Example 4. Comparison of Magenta Inks Containing Monomeric TPO and Polymeric TPOL Magenta ink formulations were prepared containing the following compositions:

TABLE 7

| Magenta Ink Formulations | | |
| --- | --- | --- |
| Ingredient | Magenta 1 | Magenta 2 |
| M202 | 63 | 62 |
| LR3130 | 5.5 | 5.5 |
| M3160 | | |
| M122 | 5 | 5 |
| Tego glide 450 | 0.30 | 0.30 |
| Magenta | 13.62 | 13.62 |
| Yellow | | |
| TPO | 7 | |
| Poly TPOL | | 8 |
| BAPO | 3 | 3 |
| Irgastab UV22 | | |

Residual amounts of monomer and TPO on polyester textile and polyester/cotton textile were analyzed by gas chromatography-mass spectrometry (GC-MS) and expressed as ppm based on ink weight alone. The results are shown below:

TABLE 8

| Residual Amounts of TPO (ppm) | | | |
| --- | --- | --- | --- |
| | | Magenta 1 | Magenta 2 |
| Polyester Textile | Residual Monomer | 119 | 122 |
| | Residual TPO | 19 | 9 |
| Polyester/Cotton Textile | Residual Monomer | 139 | 130 |
| | Residual TPO | 22 | 8 |

We claim:

1. A photocurable ink composition comprising:
   (a) a matrix comprising one or more photo-curable or photo-polymerizable monomers, oligomers, polymers, or combinations thereof;
   (b) one or more polymeric diphenyl(2,4,6-trimethylbenzoyl) phosphine oxide (TPO) photo-initiators;
   (c) and one or more pigments,
   wherein the matrix comprises one or more chain extension agents, wherein the chain extension agents comprises one or more difunctional acrylate polymers or copolymers and wherein the one or more difunctional acrylate polymer or copolymer comprises a 1,6-hexane ethoxylate diacrylate.

2. The composition of claim 1, wherein the matrix comprises one or more multifunctional crosslinking agents.

3. The composition of claim 2, wherein the multifunctional crosslinking agent comprises one or more trifunctional acrylate polymers or copolymers.

4. The composition of claim 3, wherein the one or more trifunctional acrylate polymers or copolymers comprises a trimethylolpropane ethoxylate triacrylate.

5. The composition of claim 1, wherein the matrix comprises one or more reactive diluents.

6. The composition of claim 5, wherein the one or more reactive diluents comprises one or more monofunctional acrylate polymers or copolymers.

7. The composition of claim 6, wherein the one or more monofunctional acrylate polymers or copolymers comprises a cyclic trimethylolpropoylacrylate.

8. The composition of claim 1, wherein the matrix comprises one or more monomers, oligomers, polymers, or combinations thereof to improve or enhance surface cure of the matrix.

9. The composition of claim 8, wherein the one or more monomers, oligomers, polymers, or combinations thereof to improve or enhance surface cure of the matrix comprises an amine-modified polyether acrylate.

10. The composition of claim 1, wherein the matrix comprises one or more monomers that provide flexibility, elongation, and/or stretch to the matrix.

11. The composition of claim 10, wherein the monomers comprise a urethane acrylate.

12. The composition of claim 1, wherein the polymeric TPO is a linear polymer.

13. The composition of claim 12, wherein the linear polymer is an alkylene oxide polymer or copolymer.

14. The composition of claim 13, wherein the alkylene polymer or copolymer is a polyethylene oxide homopolymer or copolymer.

15. The composition of claim 14, wherein the polyethylene oxide polymer is a polyethylene oxide homopolymer.

16. The composition of claim 1, wherein the polymeric TPO is a branched polymer.

17. The composition of claim 16, wherein the branched polymer is a branched alkylene oxide polymer or copolymer.

18. The composition of claim 17, wherein the branched alkylene polymer or copolymer is a branched polyethylene oxide homopolymer or copolymer.

19. The composition of claim 18, wherein the branched polyethylene oxide polymer is a branched polyethylene oxide homopolymer.

20. The composition of claim 1, further comprising one or more non-polymeric diphenyl(2,4,6-trimethylbenzoyl)phosphine oxide (TPO) photo-initiators.

21. The composition of claim 1, further comprising a plasticizer.

22. The composition of claim 1, wherein the ink composition is a yellow ink composition, a magenta ink composition, a cyan ink composition, a black ink composition, a light magenta ink composition, a white ink composition, a light cyan ink composition, or combinations thereof.

23. The composition of claim 1, wherein the pigment is at least one of Pigment Blue 1, Pigment Blue 15, Pigment Blue 15:1, Pigment Blue 15:3, Pigment Blue 15:4, Pigment Blue 15:6, Pigment Blue 16, Pigment Blue 17-1, Pigment Blue 22, Pigment Blue 22, Pigment Blue 27, Pigment Blue 28, Pigment Blue 29, Pigment Blue 36, and Pigment Blue 60.

24. The composition of claim 1, wherein the pigment is at least one of Pigment Red 3, Pigment Red 5, Pigment Red 8, Pigment Red 9, Pigment Red 9:8, Pigment Red 19, Pigment Red 22, Pigment Red 31, Pigment Red 38, Pigment Red 43, Pigment Red 48:1, Pigment Red 48:2, Pigment Red 48:3, Pigment Red 48:4, Pigment Red 48:5, Pigment Red 49:1, Pigment Red 53:1, Pigment Red 57:1, Pigment Red 57:2, Pigment Red 58:4, Pigment Red 63:1, Pigment Red 81, Pigment Red 81:1, Pigment Red 81:2, Pigment Red 81:3, Pigment Red 81:4, Pigment Red 88, Pigment Red 104, Pigment Red 108, Pigment Red 112, Pigment Red 122, Pigment Red 123, Pigment Red 144, Pigment Red 146, Pigment Red 149, Pigment Red 166, Pigment Red 168, Pigment Red 169, Pigment Red 170, Pigment Red 177, Pigment Red 178, Pigment Red 179, Pigment Red 184, Pigment Red 185, Pigment Red 207, Pigment Red 208, Pigment Red 216, Pigment Red 224, Pigment Red 226, Pigment Red 257, Pigment Violet 3, Pigment Violet 19, Pigment Violet 23, Pigment Violet 29, Pigment Violet 30, Pigment Violet 37, Pigment Violet 50, Pigment Violet 88, Pigment Orange 13, Pigment Orange 16, Pigment Orange 20, or Pigment Orange 36.

25. The composition of claim 1, wherein the pigment is at least one of Pigment Yellow 55, Pigment Yellow 74, Pigment Yellow 79, Pigment Yellow 93, Pigment Yellow 110, Pigment Yellow 120, Pigment Yellow 128, Pigment Yellow 138C, Pigment Yellow 139, Pigment Yellow 150, Pigment Yellow 151, Pigment Yellow 155, Pigment Yellow 156, Pigment Yellow 175, Pigment Yellow 180, Pigment Yellow 185 and Pigment Yellow 213.

26. The composition of claim 1, wherein the pigment is at least one of Pigment Black 6, Pigment Black 7, Pigment Black 9, lamp or vegetable black, bone or ivory black, and furnace or channel black.

27. An ink set comprising at least a yellow ink composition, a magenta ink composition, a cyan ink composition, and a black ink composition, wherein at least one of the ink compositions comprises the ink composition according to claim 1.

28. The ink set of claim 27, wherein at least two of the ink compositions comprises the ink composition according to claim 1.

29. The ink set of claim 27, wherein at least three of the ink compositions comprises the ink composition according to claim 1.

30. The ink set of claim 27, wherein each of the yellow ink composition, the magenta ink composition, the cyan ink composition, and the black ink composition comprise the ink composition according to claim 1.

* * * * *